United States Patent [19]

Chien-Chuan

[11] Patent Number: 5,995,399
[45] Date of Patent: Nov. 30, 1999

[54] POWER SUPPLY CONTROL CIRCUIT FOR A DC PUMP CONTAINING A WAVEFORM PROCESS CIRCUIT

[76] Inventor: Cheng Chien-Chuan, 5F, No. 6, Lane 110, Kang-Lo St., Nei-Hu, Taiepi, Taiwan

[21] Appl. No.: 09/105,790

[22] Filed: Jun. 26, 1998

[51] Int. Cl.[6] .................................................. H02M 7/5387
[52] U.S. Cl. ............................................................. 363/132
[58] Field of Search .............................. 363/17, 20, 21, 363/24, 25, 80, 131, 132, 133, 134, 159, 160

[56] References Cited

U.S. PATENT DOCUMENTS

| | | | |
|---|---|---|---|
| 4,087,850 | 5/1978 | Koizumi | 363/21 |
| 4,878,163 | 10/1989 | Yamato et al. | 363/8 |
| 5,567,997 | 10/1996 | Suzuki et al. | 307/127 |

Primary Examiner—Adolf Deneke Berhane
Attorney, Agent, or Firm—W. Wayne Liauh

[57] ABSTRACT

A power supply control circuit for a DC pump including an oscillating circuit, a frequency dividing circuit, a waveform process circuit, a bridge-type driving circuit, and a driving circuit. The waveform process circuit includes two looped time delay circuits and two NAND gates to separately receive phase-splitting signals produced by the frequency dividing circuit, so as to produce first and second phase signals having phase difference between them. The bridge-type driving circuit includes a bridge-type transistor pair composed of four transistors to separately receive and be driven by the first and second phase signals to generate a driving signal. The driving signal is sent to the driving circuit for the latter to supply working power needed by the pump. Alternatively, the bridge-type driving circuit may be composed of MOS power transistors in which case the phase-splitting signals produced by the frequency dividing circuit are directly used to drive the MOS power transistors and the waveform process circuit is omitted.

4 Claims, 4 Drawing Sheets

POWER SUPPLY CONTROL CIRCUIT FOR A DC PUMP CONTAINING A WAVEFORM PROCESS CIRCUIT

BACKGROUND OF THE INVENTION

The present invention relates to a power supply control circuit, and more particularly to a power supply control circuit for supplying working power to a DC pump.

When a certain electric appliance is specified to use an alternating current, it means the electric appliance is limited to indoor use or to the best used outdoors by connecting it to an extension line which is connected to an AC power source. When such electric appliance is to be used at places where it cannot be reached by an extension line, such as in the suburbs or in a car, it simply becomes unusable.

An example of such electric appliance is an AC pump generally used indoors. When a pump is needed at a site where no AC power source is available, the general AC pump is simply useless. For instance, an inflatable massage cushion designed for use in a car can be timely used to massage a driver's back and hips to relieve the driver from the tiredness after a long driving time. However, such massage cushion has to be actuated by a pump. Or, to inflate a big floating article on the beach, such as an inflatable raft, a pump is also required. In view that pumps are frequently needed at many outdoor places, it is necessary to develop a DC pump for convenient outdoor use.

It is known that internal components of a pump mainly include a coil, a magnet, an E-shaped steel plate, a rubber diaphragm, a push rod, etc. In the present invention an alternating current is supplied to the coil, 50 so the pump does not need a bridge-type driving circuit. However, if a direct current is supplied to the coil, a bridge-type driving circuit is needed to actuate the pump.

SUMMARY OF THE INVENTION

It is therefore a primary object of the present invention to provide a power supply control circuit for a DC pump, so that a DC power may be supplied to actuate the pump.

To achieve the above object, the control circuit of the present invention mainly includes an oscillating circuit, a frequency dividing circuit, a waveform process circuit, a bridge-type driving circuit, and a driving circuit. The bridge-type driving circuit is driven by first and second phase signals generated by the waveform process circuit to produce a driving signal which drives the driving circuit to supply working power to the DC pump for the same to work. Alternately, the bridge-type driving circuit may be composed of MOS power transistors. In the latter case, a surge absorber is connected between the MOS power transistors, and phase-splitting signals sent out by the frequency dividing circuit need not to be processed by the waveform process circuit but can be directly used to control the MOS power transistors.

BRIEF DESCRIPTION OF THE DRAWINGS

The above and other objects of the present invention as well as the circuit design thereof can be best understood by referring to the following detailed description of the preferred embodiments and the accompanying drawings, wherein.

DETAILED DESCRIPTION OF THE PREFERRED EMBODIMENTS

Figure 1:
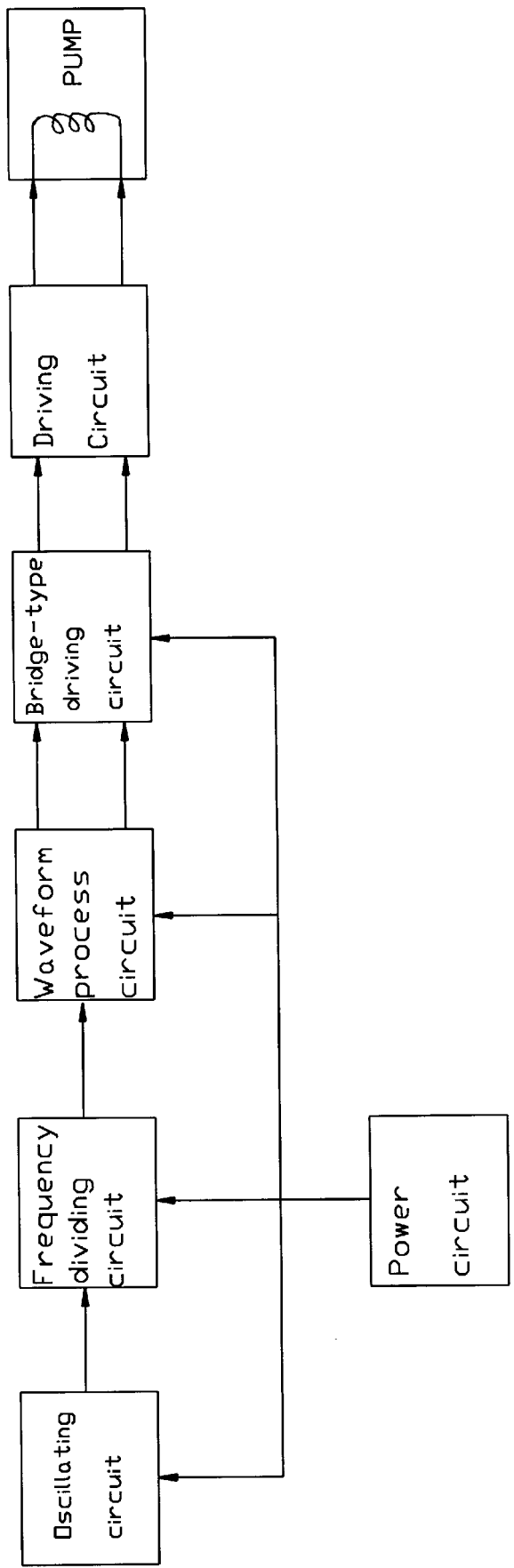
FIG. 1 is a block diagram showing the function of the circuit according to the present invention.

The present invention relates to a power supply control circuit for a DC pump. FIG. 1 is a block diagram showing the details and functions of the present invention. As shown, the circuit according to the present invention mainly includes an oscillating circuit 1, a frequency dividing circuit 2, a waveform process circuit 3, a bridge-type driving circuit 4, a driving circuit 5, and a power circuit 6. Working power needed by the oscillating circuit 1, the frequency dividing circuit 2, the waveform process circuit 3, and the bridge-type driving circuit 4 is supplied via the power circuit 6. The oscillating circuit 1 generates a signal which is processed in the frequency dividing circuit 2 and the waveform process circuit 3 and is then sent to the bridge-type driving circuit 4 for the same to produce a driving signal which drives the driving circuit 5 to supply DC power to a pump 7 for the pump to function.

Figure 2:
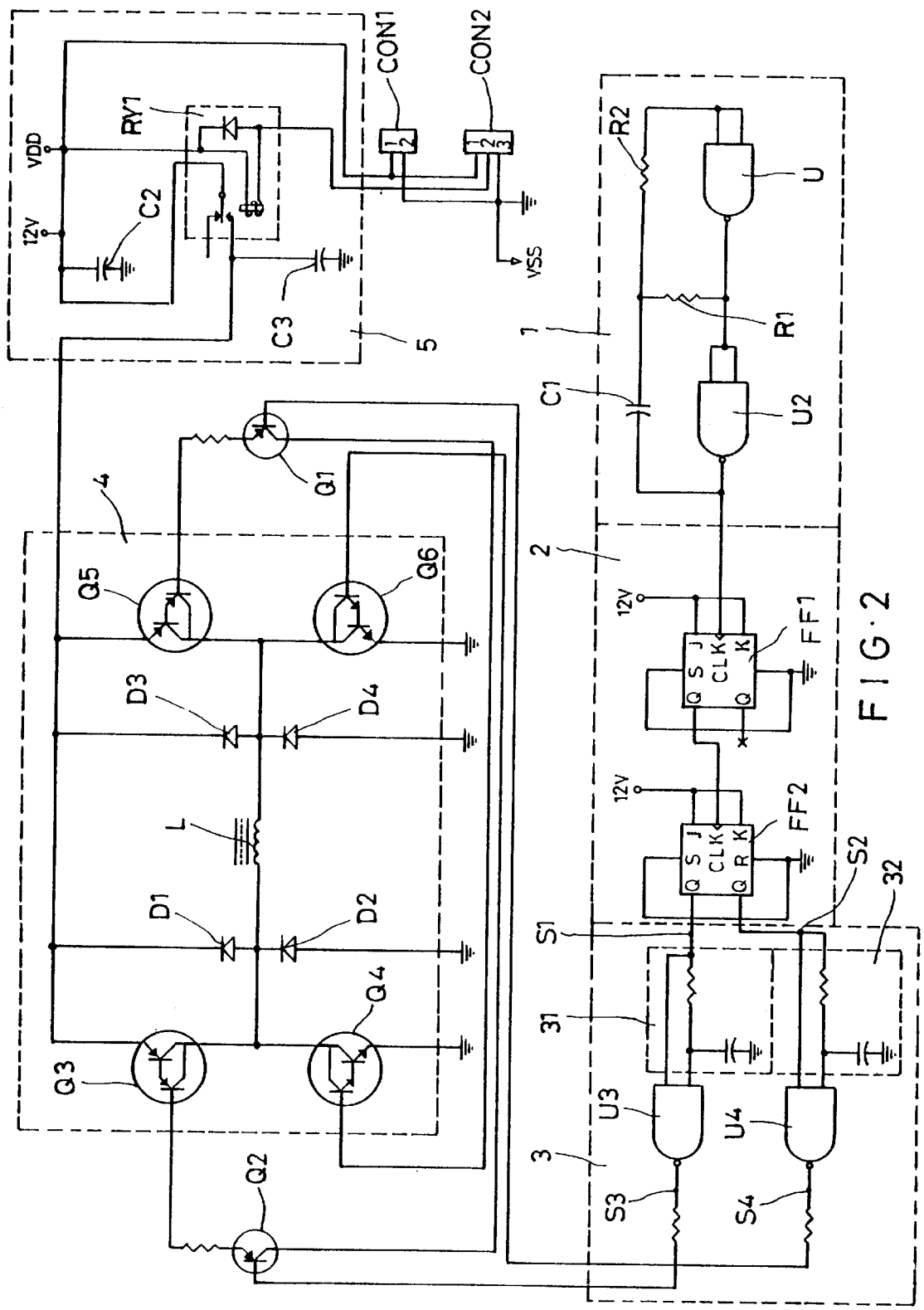
FIG. 2 is a detailed circuit diagram according to a first embodiment of the present invention.
Figure 3:
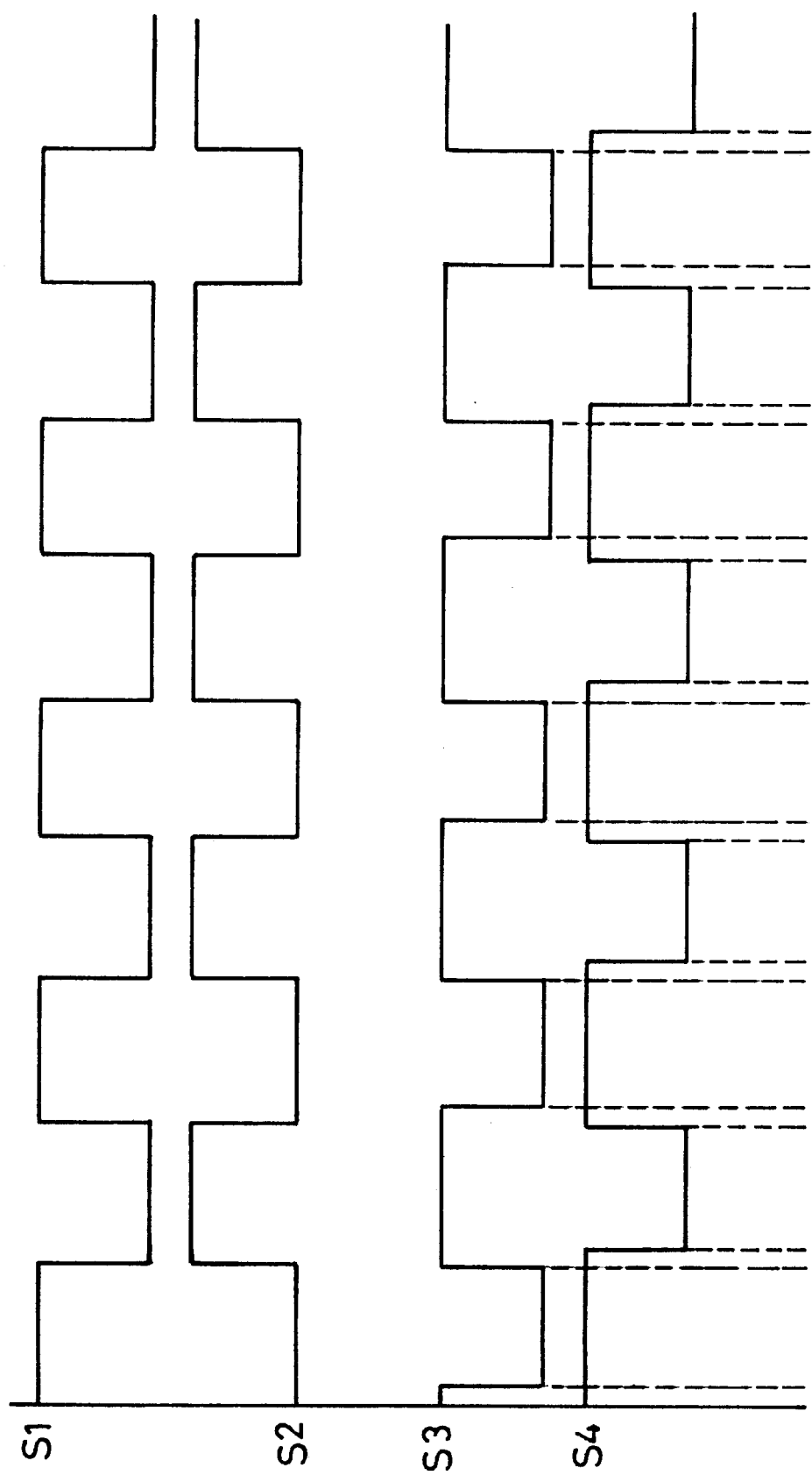
FIG. 3 illustrates waveforms of signals produced by the circuit of FIG. 2 at different points in the control circuit.

FIG. 2 is a detailed circuit diagram according to a first embodiment of the present invention. In this embodiment, the oscillating circuit 1 includes two NAND gates U1 and U2, two resistors R1 and R2, and a capacitor C1. The oscillating circuit 1 produces an oscillation frequency within the range from 240 to 360 Hz. The frequency dividing circuit 2 mainly includes a first and a second flip-flop FF1 and FF2. The first flip-flop FF1 has an output Q connected to a clock input CLK of the second flip-flop FF2, and the second flip-flop FF2 has an output and a reversed phase output which send out phase-splitting signals S1 and S2, respectively. Waveforms of signals S1 and S2 are illustrated in FIG. 3. An outgoing dividing frequency produced by the frequency dividing circuit 2 is within the range from 60 to 90 Hz. The waveform process circuit 3 includes two looped time-delay circuits 31 and 32 which receive the phase-splitting signals S1, S2, respectively, sent out by the frequency dividing circuit 2 and cause them to delay in time. These time-delay circuits 31, 32 may be a RC delay circuit composed of resistors and capacitors, or a time-delay circuit composed of other circuit components.

The function of the time-delay circuits is to prevent transistors Q6 and Q5 or Q3 and Q4 in the bridge-type driving circuit 4 from short-circuiting during the transition time the signals change from high to low. The short-circuiting of the transistors shall cause a large amount of current to flow through and burn out the transistors.

The time-delayed phase-splitting signals are separately sent to one of the inputs of NAND gates U3 and U4 included in the waveform process circuit 3. Another input of the NAND gates U3, U4 are connected to the outputs of the second flip-flop FF2 (that is, to the phase-splitting signals S1, S2). In the NAND gates, NAND logic operation is conducted for the two time-delayed signals S1, S2 to generate a first phase signal S3 and a second phase signal S4 having a phase difference from the first phase signal S3.

From the sequences shown in FIG. 3, it can be seen that signals S1, S2 sent out by the second flip-flop FF2 function basing on the same time axis during the transition time the signals change from high to low. However, signals S3, S4 sent out from the NAND gates U3, U4 can function separately at the same time and therefore prevent the transistors Q3, Q4, Q5, and Q6 in the bridge-type driving circuit 4 from short-circuiting.

The first phase signal S3 and the second phase signal S4 sent out by the waveform process circuit 3 are separately routed to two transistors Q1 and Q2 in the bridge-type driving circuit 4 for output driving, so that there is sufficient base current flowing to the inputs of the transistors Q3, Q4, Q5, and Q6 to allow these transistors to have big amount of current flowing out therefrom and to ensure that these transistors function in a saturation area.

In the bridge-type driving circuit 4, the four transistors Q3, Q4, Q5, and Q6 together form a bridge-type transistor pair, wherein transistors Q3 and Q5 form a group while transistors Q4 and Q6 form another group in the pair. These two groups of transistors are not allowed to be ON at the same time in order to avoiding short circuit. However, the two groups may be OFF at the same time. When the transistors in one group are ON, current flows from left to right and passes an inductance L to produce a magnetic field in one direction. And, when the transistors in another group are ON, current flows from right to left to pass the inductance L to produce a magnetic field in another direction. This enables the formation of reciprocating impact in the pump 7.

The bridge-type driving circuit 4 also includes four diodes D1, D2, D3 and D4 respectively connected in parallel between a collector and an emitter of the transistors Q3, Q4, Q5, and Q6. These four diodes function as back electromotive force diodes. That is, as described above, when the four transistors Q3, Q4, Q5, and Q6 are OFF at the same time, energy in the inductance L is released via the diodes D1, D2, D3, and D4 to charge two capacitors C2 and C3 included in the driving circuit 5. In the event the diodes D1, D2, D3, and D4 are not included in the bridge-type driving circuit 4, a simultaneous OFF of the transistors Q3, Q4, Q5, and Q6 shall cause the high energy in the inductance L to flow toward the transistors Q3, Q4, Q5, and Q6 and accordingly damages components in the circuit.

The driving circuit 5 also includes a relay RY1 and another two capacitors C4, C5 which are used to stabilize voltage and to absorb back electromotive force.

A 12 V direct current is supplied to the control circuit of the present invention via a power input terminal CON1 for supplying the 12 V DC power needed by the control circuit. A power output terminal CON2 is connected to the pump 7 for supplying power needed by the pump 7 to work.

With the above arrangements, when a power supplied from a power source 6 is processed by the oscillating circuit 1, the frequency dividing circuit 2, and the waveform process circuit 3 included in the present invention, signals can be produced to drive the bridge-type driving circuit 4 for the same to function. And then, a driving signal is produced by the bridge-type driving circuit to drive the driving circuit 5, so that current from an external DC power source can be supplied to the pump 7 for the same to work.

Figure 4:
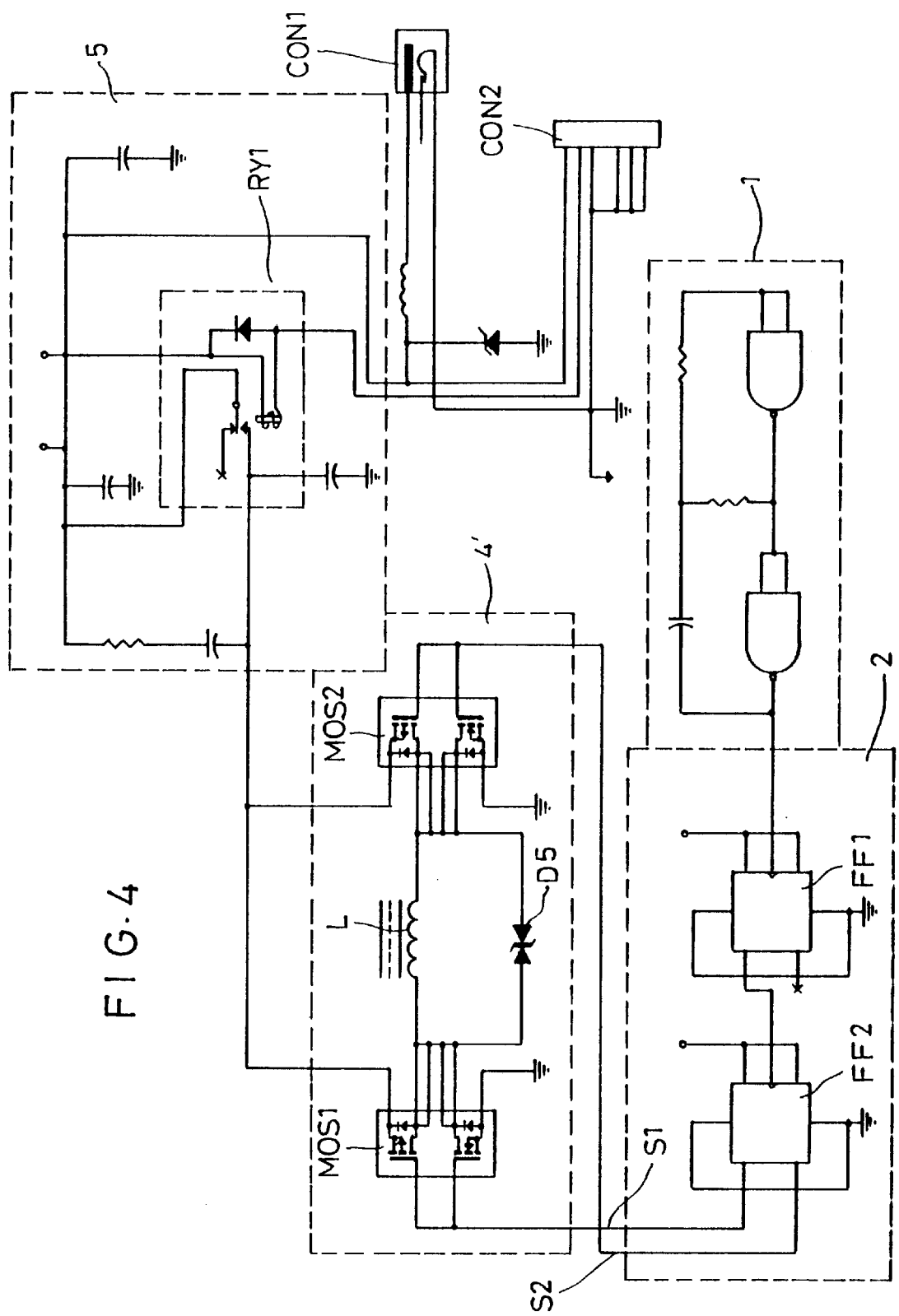
FIG. 4 is a detailed circuit diagram according to a second embodiment of the present invention.

FIG. 4 is a detailed circuit diagram according to a second embodiment of the present invention. In this second embodiment, the circuit configuration is generally the same as that for the first embodiment, except that a bridge-type driving circuit 4' thereof is composed of two MOS power transistors MOS1 and MOS2 and a surge absorber D5 connected between them. Due to the electric property of the bridge-type driving circuit 4', phase-splitting signals S1, S2 sent out by the frequency dividing circuit 2 need not to be processed by a waveform process circuit 3 but can be directly sent to the grids of the MOS power transistors MOS1 and MOS2.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A power supply control circuit for a DC pump, comprising:

an oscillating circuit for producing an oscillatory signal;

a frequency dividing circuit for receiving said oscillatory signal produced by said oscillating circuit and dividing the frequency of said oscillatory signal to produce two phase-splitting signals;

a bridge-type driving circuit which is driven by said phase-splitting signals produced by said frequency dividing circuit and then generates a driving signal, wherein said bridge-type driving circuit is a bridge-type transistor pair comprising four transistors;

a driving circuit which receives and responds to said driving signal generated by said bridge-type driving circuit to supply working power needed by said pump; and a waveform process circuit connected between said bridge-type driving circuit and said frequency dividing circuit, said waveform process circuit including two looped time delay circuits and two NAND gates, said time delay circuits separately receiving said two phase-splitting signals produced by said frequency dividing circuit and producing two time delayed phase-splitting signals which and said phase-splitting signals originally produced by said frequency dividing circuit being separately sent to said NAND gates for logical operation thereat, so that first and second phase signals having phase difference between them are produced for controlling said transistors included in said bridge-type driving circuit.

2. A power supply control circuit for a DC pump as claimed in claim 1, wherein said bridge-type driving circuit is a bridge circuit comprises two pairs of MOS power transistors, and each pair of said MOS power transistors are directly driven by said phase-splitting signals produced by said frequency dividing circuit.

3. A power supply control circuit for a DC pump as claimed in claim 1, wherein said bridge-type driving circuit further comprises four diodes being respectively connected in parallel between a collector and an emitter of the transistors for use as back electromotive force diodes.

4. A power supply control circuit for a DC pump as claimed in claim 1, wherein said frequency dividing circuit comprises a first and a second flip-flops, said first flip-flop having an output connected to a clock input of said second flip-flop, and said phase-splitting signals being sent out from an output and a reversed phase output of said second flip-flop.

* * * * *